(12) United States Patent
Dominguez

(10) Patent No.: US 7,051,647 B2
(45) Date of Patent: May 30, 2006

(54) FILTER COFFEE MAKER WITH LOCKING DEVICE FOR PIVOTABLE FILTER HOLDER

(75) Inventor: Augustin Dominguez, Tarbes (FR)

(73) Assignee: SEB S.A., Ecully (FR)

( * ) Notice: Subject to any disclaimer, the term of this patent is extended or adjusted under 35 U.S.C. 154(b) by 108 days.

(21) Appl. No.: 10/860,637

(22) Filed: Jun. 4, 2004

(65) Prior Publication Data

US 2005/0045044 A1 Mar. 3, 2005

(30) Foreign Application Priority Data

Jun. 6, 2003 (FR) .................................. 03 06863

(51) Int. Cl.
*A47J 31/06* (2006.01)
(52) U.S. Cl. .......................................... 99/295; 99/306
(58) Field of Classification Search ................. 99/279, 99/295–307, 316, 317; 426/284–288, 433; 210/481, 474, 476
See application file for complete search history.

(56) References Cited

U.S. PATENT DOCUMENTS

| | | | | |
|---|---|---|---|---|
| 3,374,897 A | * | 3/1968 | Martin | 210/455 |
| 3,610,132 A | * | 10/1971 | Martin et al. | 99/295 |
| 3,861,285 A | * | 1/1975 | Martin | 99/295 |
| 3,920,554 A | * | 11/1975 | Sanders | 210/247 |
| 4,303,525 A | * | 12/1981 | Stover | 210/455 |
| 4,309,939 A | * | 1/1982 | Stover | 99/280 |
| 4,579,048 A | * | 4/1986 | Stover | 99/280 |
| 4,603,620 A | * | 8/1986 | Daugherty | 99/300 |
| 4,642,190 A | * | 2/1987 | Zimmerman | 210/464 |
| 4,765,896 A | * | 8/1988 | Hartley et al. | 210/474 |
| 4,832,845 A | * | 5/1989 | Hendretti | 210/470 |
| 4,920,871 A | * | 5/1990 | Anson et al. | 99/295 |
| 5,113,752 A | | 5/1992 | Brewer | |

FOREIGN PATENT DOCUMENTS

| | | |
|---|---|---|
| DE | 1 082 598 | 5/1970 |
| DE | 196 20 381 A1 | 1/1997 |
| EP | 0655 213 A1 | 5/1995 |

\* cited by examiner

*Primary Examiner*—Timothy F. Simone
(74) *Attorney, Agent, or Firm*—Browdy and Neimark, PLLC

(57) ABSTRACT

A filter coffee maker having a filter holder, a case providing a filter holder housing for receiving the filter holder, and a pedestal provided to receive a carafe. The filter holder housing has at least one concave structure having an upper entrance, a lateral wall having a lower end, an upper bearing zone extending from the lower end of the lateral wall, and a retaining threshold disposed between the upper bearing zone and the lateral wall. The filter holder has at least one upper retaining means provided to cooperate with the upper bearing zone.

23 Claims, 4 Drawing Sheets

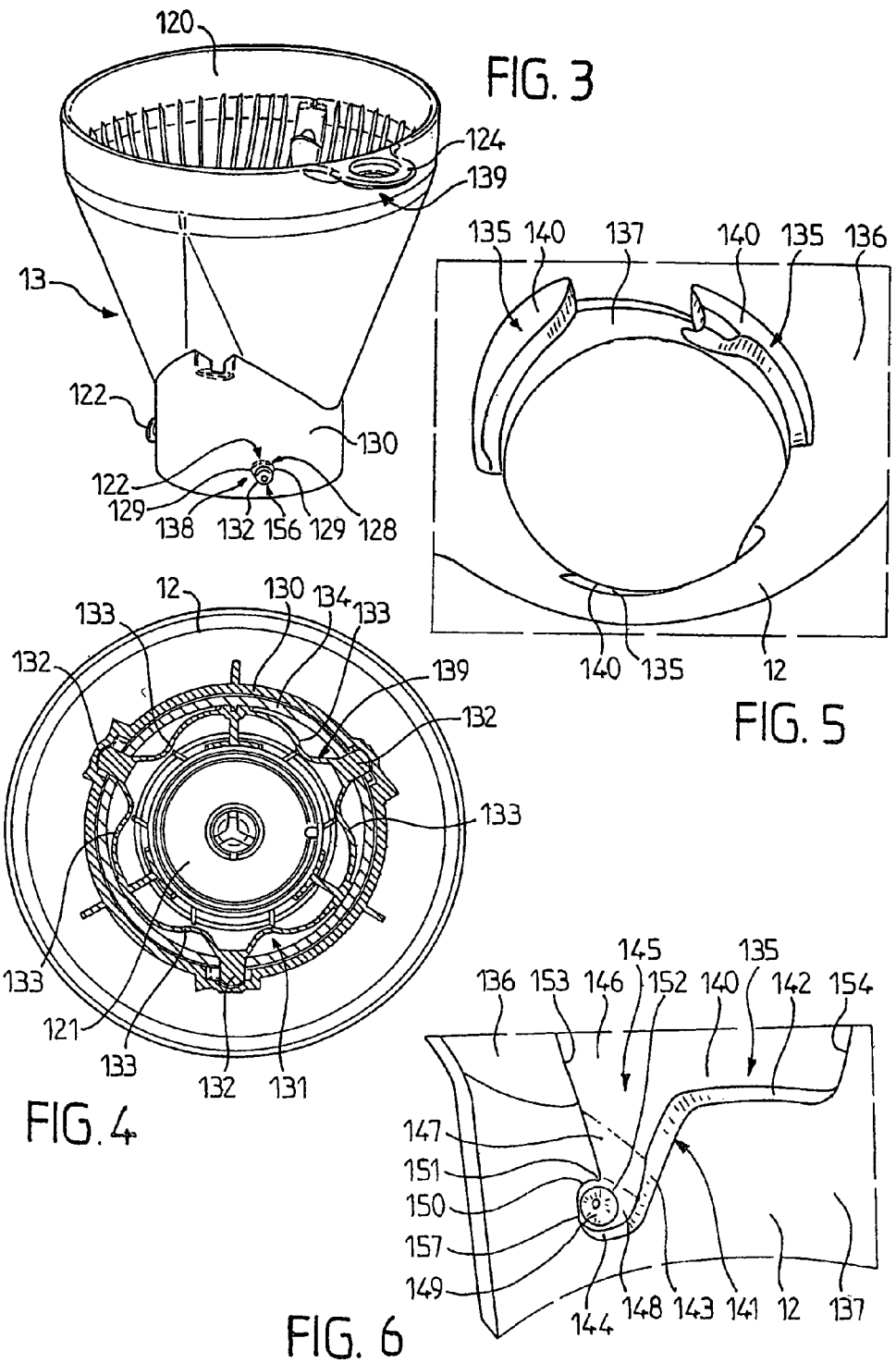

FILTER COFFEE MAKER WITH LOCKING DEVICE FOR PIVOTABLE FILTER HOLDER

CROSS REFERENCE TO RELATED APPLICATIONS

The present application relates to subject matter disclosed in an application by Lalanne entitled FILTER COFFEE MAKER WITH DISTRIBUTION OF HOT WATER IN THE LID filed on or about the same date as the present application and claiming priority from French application number FR 03 06858. The disclosures of the above-cited U.S. and French applications are incorporated herein by reference.

BACKGROUND OF THE INVENTION

The present invention relates to the general technical field of hot beverage making machines, such as filter coffee makers. The invention concerns more particularly appliances having a filter holder equipped with a non-drip valve capable of being lifted by a coffee pot, or carafe.

In appliances of the type described above, when the filter holder is removable from the case, it is necessary to provide means for blocking the filter holder in order to prevent lifting of the filter holder during engagement of the carafe under the filter holder.

There are known appliances of this type in which the filter holder has an elastic foot capable of engaging with a lug of the case. The lug is arranged in the lower part of a filter holder support mounted to be pivotable with respect to the case. The filter holder support is mounted to be removable from the body of the case, for cleaning. The case has an upper part covering the filter holder. These arrangements permit one to envision a case having a pivotable lid arranged above the filter holder. However, withdrawal of the filter holder is difficult if the filter holder support has not been withdrawn from the case.

BRIEF SUMMARY OF THE INVENTION

The present invention provides a filter coffee maker having a filter holder equipped with a non-drip valve capable of being lifted by a carafe, which coffee maker presents an ergonomic construction.

The invention is embodied in a filter coffee maker having a case providing a filter holder housing, provided to receive a filter holder, and a pedestal provided to receive a carafe. The filter holder housing has at least one concave structure having an upper entrance, a lateral wall prolonged at its lower end by an upper bearing zone, and a retaining threshold being arranged between the upper bearing zone and the lateral wall. The filter holder has at least one upper retaining means provided to cooperate with the upper bearing zone. This arrangement permits blocking of vertical translational movement of the filter holder placed in the housing of the filter holder. Thus, placement of the carafe under the filter holder does not produce an excessive lifting of the filter holder. The escape of steam out of the appliance between the outlet of a delivery head arranged in the lid and the filter holder can thus be significantly reduced, or even completely prevented. As a result, it is not necessary to make any provision for blocking the lid with respect to the case and the lid can be simply mounted in a pivoting manner on the case.

Advantageously, the concave structure presents a lower bearing zone having an inclined part connected to a lower part, the upper bearing zone being arranged above the lower part, and the filter holder has at least one guide means provided to cooperate with the lower bearing zone. This arrangement permits the filter holder to be guided toward its locking position and the user need only place the filter holder in the filter holder housing.

Advantageously then, the lower bearing zone has an upper part connected to the inclined part. This permits a raised position to be offered, facilitating withdrawal of the filter holder.

Also advantageously, the filter holder has one or more lateral bearing means permitting the filter holder to be guided and stabilized.

Also advantageously, at least one of the lateral bearing means is associated with a restoring means that will permit a better stabilization of the filter holder.

According to an advantageous form of construction, the lateral bearing means are formed by lugs arranged on elastic tongues that emerge from a ring belonging to the filter holder. The lugs can also form guide means.

According to another advantageous feature, for good guidance and good maintenance, the ring has at least three lugs.

Also advantageously, for better holding, a cavity is arranged in the concave structure under the upper bearing zone. The cavity can receive the lateral bearing means.

According to a further advantage, the cavity is arranged in a lower retaining zone of the concave structure, the lower retaining zone being extended by a zone that is inclined toward the upper entrance of the concave structure. This arrangement permits retention of the filter holder in the filter holder housing to be improved.

According to a further feature, the filter holder has an upper bearing means in contact with the case when the upper retaining means is in contact with the upper bearing zone. This arrangement permits vertical blocking of the filter holder in the filter holder housing.

According to an advantageous arrangement, the carafe has an upper blocking piece furnished with a filling valve associated with a restoring means. Contact of the filling valve with the filter holder permits collection of the beverage in the carafe, aromas being preserved when the carafe is withdrawn from the pedestal.

According to another advantageous arrangement, the filter holder has a lower blocking valve associated with a restoring means, permitting the beverage to be retained in the filter holder when the carafe is not in place on the base. When the carafe is placed on the base, it is able to actuate the blocking valve in order to permit delivery of the beverage.

BRIEF DESCRIPTION OF THE DRAWINGS

FIG. 3 is a perspective view of the filter holder shown in FIG. 1.

FIG. 4 is a partial cross-sectional view showing the housing of the filter holder and the filter holder of FIG. 3, viewed from the bottom.

FIG. 5 is a perspective detail view of the lower part of the filter holder housing shown in FIG. 4.

FIG. 6 is a detail view of a portion of the lower part of the filter holder shown in FIG. 5.

DETAILED DESCRIPTION OF THE INVENTION

Figure 1:
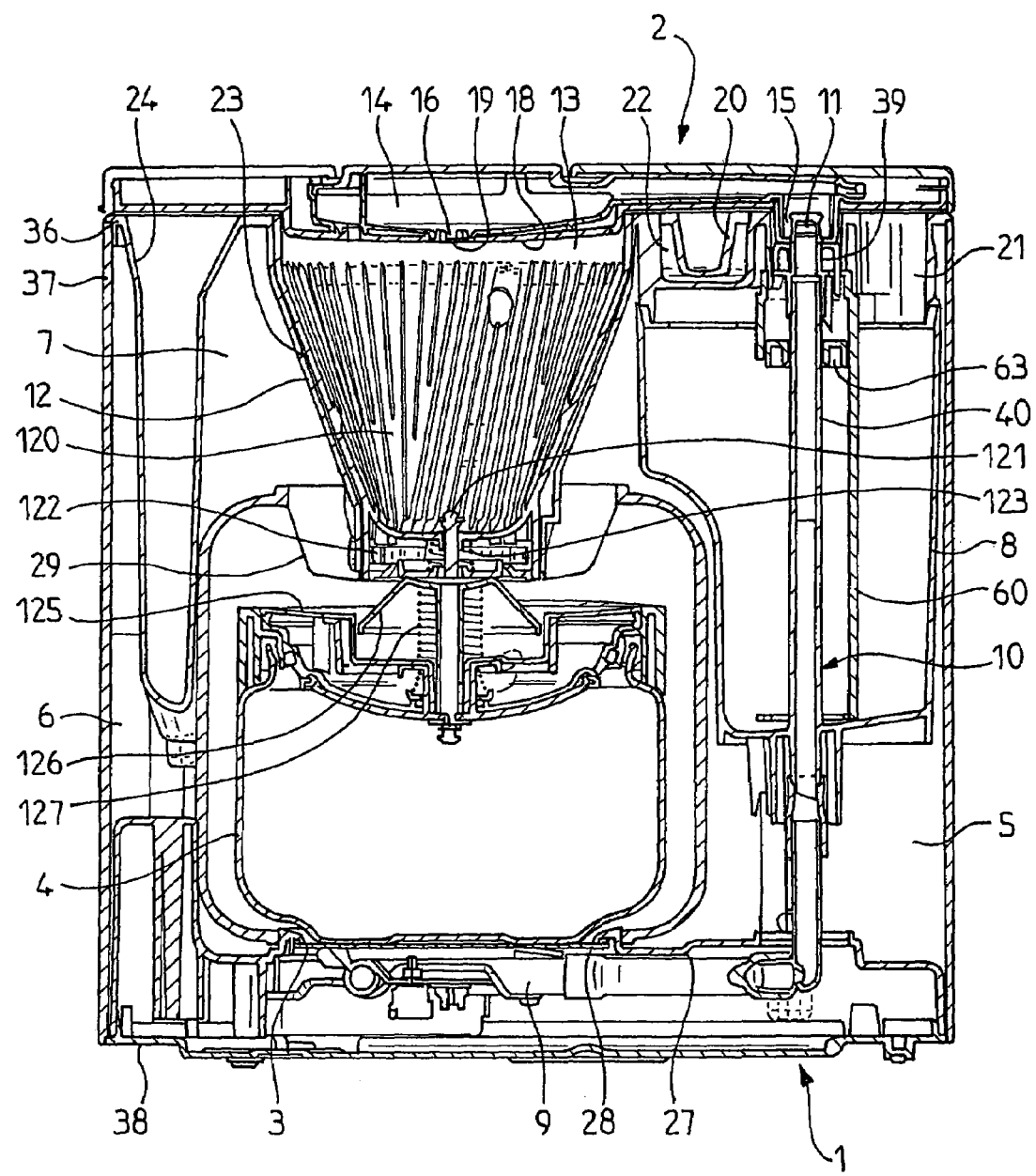
FIG. 1 is an elevational, cross-sectional view of a coffee maker according to one embodiment of the present invention.

The filter coffee maker illustrated in FIG. 1 has a case 1 closed by a lid 2. Case 1 has a pedestal 3 for receiving a coffee pot, or carafe, 4. Case 1 provides a first post, or upright, 5, at one side and second post, or upright, 6 at the other side of base 3. First post 5 and second post 6 are connected by an arch 7 above base 3. A water reservoir 8 is arranged in case 1 and is connected to a boiler 9 provided in case 1. This connection is not specifically shown, but conforms to conventional practice in this art. Water reservoir 8 is arranged partially in first post 5. Boiler 9 is disposed in pedestal 3 and is connected to an ascending conduit 10 through which boiled water rises.

Ascending conduit 10 is provided in its upper part with a hot water outlet orifice 11 and a part of conduit 10 passes through water reservoir 8. Case 1 further includes a filter holder housing 12 and a filter holder 13. Housing 12 is formed in arch 7. Filter holder 13 is disposed in housing 12 and a water delivery head 14 is arranged in lid 2. Delivery head 14 has an inlet opening 15 communicating with an outlet opening 16. Ascending conduit 10 is connected to inlet opening 15 when lid 2 closes case 1, at which time outlet opening 16 is disposed above filter holder 13.

Filter holder 13 includes a filter cone 120 provided with internal grooves, a lower flow blocking valve 121 and holding means 122. Valve 121 is associated with a restoring, or biasing, means 123. Carafe 4 has an upper closing part 125 provided with a filling valve 126 cooperating with valve 121 when carafe 4 is in place on pedestal 3. Filling valve 126 is associated with another restoring, or biasing, means 127.

Figure 2:
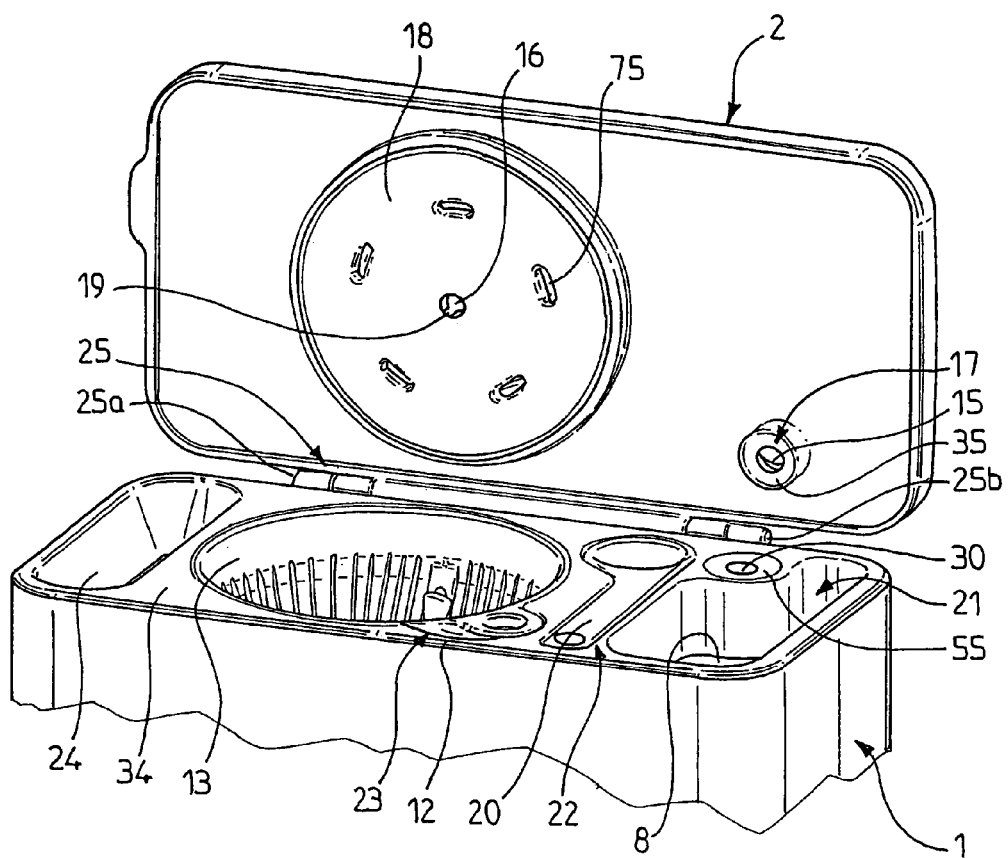
FIG. 2 is a perspective view of the upper portion of the embodiment of FIG. 1, with the lid raised.

As shown more clearly in FIG. 2, lid 2 is pivoted on case 1 and water reservoir 8 is open at its upper end. The lower face of lid 2 is provided with a protuberance 17 in which inlet opening 15 is formed. The lower face of lid 2 is further provided with a boss 18 having an opening 19 aligned with opening 16 of delivery head 14 to allow flow of hot water from head 14.

At the upper face of case 1, there is provided a filling opening, or mouth, 21 that is located above reservoir 8 and is formed in first post 5. An accessory housing 22 is also formed in the upper face of case 1 alongside filling opening 21. Housing 22 is provided to receive a coffee measure 20 and is arranged in arch 7 above water reservoir 8. A compartment 23 is also formed in the upper face of case 1 alongside accessory housing 22 and forms filter holder housing 12. Compartment 23 is arranged in arch 7 above the location of carafe 4. A compartment 24 for storing a supply of spare filters is also arranged in the upper face of case 1 alongside compartment 23. Housing 24 is arranged in second post 6.

The upper face of case 1 is also defined by a support 36 that forms a unit with a lateral wall. Opening 21, accessory housing 22, compartment 23 and spare filter housing 24 are formed in support 36. Water reservoir 8 is maintained between support 36 and a part 27 that is assembled to support 36 by means of screws (not shown). Part 24 also serves to support a heating plate 28 in contact with boiler 9. Support 36 is mounted on a skirt 37 and the lower part of skirt 37 is closed by a base 38, shown in FIG. 1. Base 38 is assembled with part 27 by means of screws (not shown). A dish, or bowl, 29 is suspended from a lower wall of support 36 above heating plate 28 and is provided to receive the lower part of filter holder housing 12.

An outlet orifice of ascending conduit 10 is formed in a hood 39 that is fixed to case 1. Hood 39 is mounted on a hot water riser tube 40 that forms a part of conduit 10 and that is made, for example, of polypropylene. Tube 40 advantageously extends from the bottom of water reservoir 8. Hood 39 forms, along with tube 40, part of ascending conduit 10. Hood 39 is fixed to a support. More particularly, the support has elastic hooks that engage with a collar of hood 39, as well as other elastic hooks that engage with a lower tubular part of hood 39. A tubular part is disposed beneath the collar and fits around tube 40 with an end clearance. This arrangement permits thermal expansion of tube 40.

Lid 2 has an upper wall that is pivotably mounted to skirt 37, for example by pivot elements 25 as shown in FIG. 2. Specifically, as shown in FIG. 2, upper wall 45 of lid 2 is coupled to skirt 37 by hinges 25a and 25b. The outlet orifice of conduit 10 is located to face toward the pivot connection between lid 2 and case 1 and the pivot connection 25 is adjacent to both filling opening, or mouth, 21 and spare filter housing 24.

The upper wall of lid 2 is assembled to a lower wall of lid 2 and the upper wall has a downwardly extending peripheral edge. The Lower wall has an upwardly extending peripheral edge 48. Lugs provided on the outer face of the upwardly extending peripheral edge are provided to cooperate with notches provided on the inner face of the downwardly extending peripheral edge.

Figure 3A:
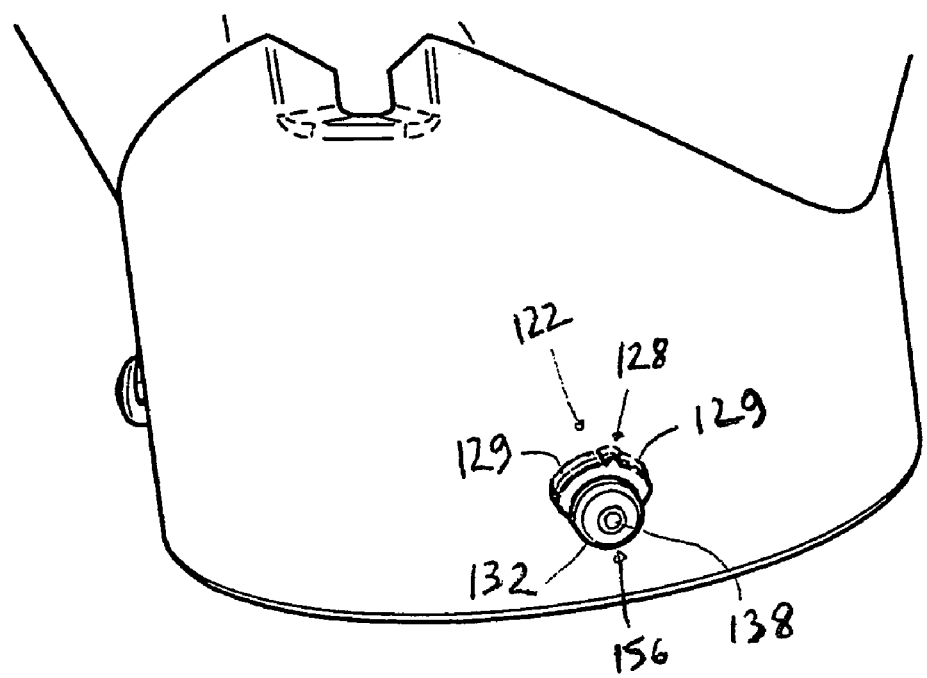
FIG. 3A is a detail view of the lower part of the filter holder shown in FIG. 3.

FIGS. 3 and 3A show filter holder 13 in greater detail. A handle 124 is arranged at the level of the upper edge of filter cone 120. Cone 120 is prolonged at its lower end by a cylindrical wall 130 on which are arranged projections 128 forming upper retaining means 122. In the illustrated embodiment, filter holder 13 carries three projections 128 distributed around the periphery of cylindrical wall 130. Each projection 128 has inclined lateral walls 129.

As better seen in FIG. 4, lugs 132 extend from a locking piece 131. FIG. 4 is a cross section of filter 13 below projections 128 and the latter projections are not visible in FIG. 4. Each lug 132 is located below a respective projection 128. Lugs 132 are provided on elastic tongues 133 connected to a ring 134 of locking piece 131. The two ends of each elastic tongue 133 are connected to ring 134. Ring 134 is mounted at the interior of cylindrical wall 130 of filter cone 120. Lugs 132 extend out of ring 134 through passages arranged in the outer lateral wall of ring 134. Lower blocking valve 121 is mounted within ring 134.

As shown in FIG. 5, filter holder housing 12 has an upper frustoconical part 136 prolonged downwardly by a cylindrical part 137. Three concave structures 135 provided to receive retaining means 122 are arranged at the junction of frustoconical upper part 136 and cylindrical lower part 137. As shown in FIG. 6, each concave structure 135 has an upper entrance 140 and a lower bearing zone 141 composed of an upper part 142, an inclined part 143 and a lower part 144. Inclined part 143 extends between upper part 142 and lower part 144. The upper entrances 140 of structures 135 open into upper frustoconical part 136. Lugs 132 form guide means 156 on their lower face provided to cooperate with lower bearing zones 141 and lateral bearing means 138 at their ends. Each concave structure 135 has a bump out 145 presenting an upper acceptance zone 146, an inclined intermediate transition zone 147 and a lower retaining zone 148. Lugs 132 provide lateral bearing means 138. Elastic tongues 133 provide restoring means, or biasing means, 139 for lateral bearing means 138. In upper acceptance zones 146, lateral bearing means 138 are not in contact with the lateral walls of filter holder housing 12. Lateral bearing means 138 come into contact with the lateral walls of filter holder housing 12 in intermediate transition zones 147 and remain in contact with the lateral walls of filter holder housing 12 at lower retaining zones 148, to assure a good retention of filter holder 13.

At the inner side of each structure 135, a cavity 149 having chamfered walls is provided in lower retaining zone 148. An upper bearing zone 150 is formed above lower part 144. A blocking threshold 152 is formed between cavity 149 and inclined zone 147. Bump out 145 has two lateral walls 153. Lateral wall 153 joins to a retaining threshold 151. Lateral wall 154 joins to upper part 142. Lateral walls 153 and 154 are advantageously inclined toward upper entrance 140. Lateral wall 153 is prolonged at its lower end by upper bearing zone 150. Retaining threshold 151 is arranged between upper bearing zone 150 and lateral wall 153. A lateral abutment 157 connects lower part 144 of lower bearing zone 141 to upper zone 150.

Handle 124 forms an upper bearing means on case 1 and permits vertical translational movement of filter holder 13 in filter holder housing 12 to be blocked.

The coffee maker according to the invention is used in the following manner.

When the user inserts filter holder 13 in housing 12, the cooperating forms of filter holder housing 12 and filter holder 13 bring guide means 156 formed by lugs 132 into contact with inclined parts 143 of lower bearing zones 141, and/or lateral bearing means 138 formed by lugs 132 into contact with inclined zones 147 of concave structures 135. Cylindrical wall 130 of filter holder 13 is guided in rotation by lower cylindrical part 137 of filter holder housing 12. The weight of filter holder 13 suffices to cause inclined zones 147 to push lateral bearing means 138 back against restoring means 139. Blocking thresholds 152 are then crossed. When carafe 4 furnished with an upper blocking piece 125 is placed on pedestal 3, filling valve 126 pushes lower blocking valve 121 of filter holder 13 and lateral edges 129 of projections 128 forming upper retaining means 122 are brought into contact with upper bearing zones 150. Retaining thresholds 151 prevent upward return movement of filter holder 13 under the action of carafe 4. Handle 124 forms the upper bearing means with respect to case 1 and permits blockage of vertical translational movement of filter holder 13 in filter holder housing 12.

To withdraw filter holder 13 from housing 12, the user can pivot handle 124. Lateral bearing means 138 are then guided by the chamfered walls of cavities 149 and move past blocking thresholds 152, upper retaining means 122 move past retaining thresholds 151, and guide means 156 come to bear on inclined parts 143 and then on upper parts 142. Filter holder 13 then rests in a raised position in housing 12 and can be easily withdrawn from the coffee maker.

The coffee maker according to the invention can then be used in a particularly practical manner. In addition, creation of a tight seal between lid 2 and the upper part of case 1 around compartment 23 for the preparation of a hot beverage is facilitated. For this purpose, seal can be provided around lower boss 18 to come to bear on upper wall 34 of case 1. Alternatively, a water seal can be created between the side wall of boss 18 and the upper part of the side wall of filter holder 13. The coffee maker according to the invention particularly permits the escape of aromas to be generally limited.

According to one possible variation, filter holder 13 is not necessarily provided with three upper retaining means 122 and housing 12 does not necessarily have three concave structures 135. A single upper retaining means 122 could cooperate with a single concave structure 135.

According to another variation, upper retaining means 122 could be formed by lugs 132.

By way of a further variation, upper blocking part 125 of carafe 4 would not necessarily have a filling valve 126. Upper blocking piece 125 can cooperate directly with lower blocking valve 121.

According to yet another possible variation, filter holder 13 would not necessarily have a lower blocking valve 121.

According to yet another variation, lid 2 is not necessarily pivoted on case 1. Lid 2, being provided to close case 1, could be a physically separate part that can be simply placed on case 1 when the coffee maker is put into use.

According to still another variant, there need not necessarily be provided three lateral bearing means 138.

According to still another variant, restoring means 139 could be formed by one or several elastic tongues 133, or by springs that are independent of lugs 132.

According to another variant, the upper bearing means is not necessarily formed by handle 124 of filter holder 13.

According to still another variant, the number of guide means 156 can be other than three.

As an alternative to the embodiment illustrated herein, the filter holder could be eliminated and a reusable filter (e.g. a "gold" filter) could be used in place of disposable filters. Preferably then, if the filter holder is eliminated, the filter holder housing may be constructed to directly receive the reusable filter.

This application relates to subject matter disclosed in French Application number FR 03 06863, filed on Jun. 6, 2003, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A filter coffee maker comprising a filter holder, a case providing a filter holder housing for receiving said filter holder, and a pedestal provided to receive a carafe, wherein:
    said filter holder housing comprises at least one concave structure, said concave structure having an upper entrance, a lateral wall having a lower end, an upper bearing zone extending from said lower end of said lateral wall, and a retaining threshold disposed between said upper bearing zone and said lateral wall; and
    said filter holder has at least one upper retaining means provided to cooperate with said upper bearing zone.

2. The filter coffee maker of claim 1, wherein: said concave structure presents a lower bearing zone having an inclined part and a lower part connected to said inclined part; said upper bearing zone is located above said lower part, and said filter holder has at least one guide means provided to cooperate with said lower bearing zone.

3. The filter coffee maker of claim 2, wherein said lower bearing zone further has an upper part connected to said inclined part.

4. The filter coffee maker of claim 3, wherein said filter holder has at least one lateral bearing means for permitting said filter holder to be guided and stabilized in said filter holder housing.

5. The filter coffee maker of claim 4, wherein said filter holder further has a restoring means cooperating with said at least one lateral bearing means for providing a further stabilization of said filter holder.

6. The filter coffee maker of claim 5, wherein said filter holder comprises a ring and elastic tongues that emerge from said ring, further wherein said lateral bearing means comprise at least one lug carried by said elastic tongues.

7. The filter coffee maker of claim 6, wherein said at least one lug is constituted by at least three lugs carried by said elastic tongues.

8. The filter coffee maker of claim 7, wherein said concave structure is provided with a cavity located under said upper bearing zone.

9. The filter coffee maker of claim 8, wherein said concave structure further has a lower retaining zone in which said cavity is disposed, and an intermediate transition zone that forms an extension of said lower retaining zone and that is inclined toward said upper entrance of said concave structure.

10. The filter coffee maker of claim 9, wherein said filter holder further has an upper bearing means in contact with said case when said upper retaining means is in contact with said upper bearing zone.

11. The filter coffee maker of claim 10 in combination with a carafe, wherein said carafe comprises an upper blocking piece, a filling valve furnished in said upper blocking piece, and associated with a restoring means associated with said filling valve.

12. The filter coffee maker of claim 11, wherein said filter holder has a lower blocking valve and a second restoring means associated with said lower blocking valve.

13. The filter coffee maker of claim 1, wherein said filter holder has at least one lateral bearing means for permitting said filter holder to be guided and stabilized in said filter holder housing.

14. The filter coffee maker of claim 13, wherein said filter holder further has a restoring means cooperating with said at least one lateral bearing means for providing a further stabilization of said filter holder.

15. The filter coffee maker of claim 14, wherein said filter holder comprises a ring and elastic tongues that emerge from said ring, further wherein said lateral bearing means comprise at least one lug carried by said elastic tongues.

16. The filter coffee maker of claim 15, wherein said at least one lug is constituted by at least three lugs carried by said elastic tongues.

17. The filter coffee maker of claim 1, wherein said concave structure is provided with a cavity located under said upper bearing zone.

18. The filter coffee maker of claim 17, wherein said concave structure further has a lower retaining zone in which said cavity is disposed, and an intermediate transition zone that forms an extension of said lower retaining zone and that is inclined toward said upper entrance of said concave structure.

19. The filter coffee maker of claim 1, wherein said filter holder further has an upper bearing means in contact with said case when said upper retaining means is in contact with said upper bearing zone.

20. The filter coffee maker of claim 1 in combination with a carafe, wherein said carafe comprises an upper blocking piece, a filling valve furnished in said upper blocking piece, and associated with a restoring means associated with said filling valve.

21. The filter coffee maker of claim 1, wherein said filter holder has a lower blocking valve and a second restoring means associated with said lower blocking valve.

22. The filter coffee maker of claim 1, wherein said lateral wall is inclined toward said upper entrance.

23. The filter coffee maker of claim 1, wherein said upper retaining means comprise a projection for engaging said upper bearing zone.

* * * * *